United States Patent [19]

Peterson

[11] 4,239,383
[45] Dec. 16, 1980

[54] ILLUMINATION MEANS FOR ELECTROGRAPHIC REPRODUCTION

[75] Inventor: John A. Peterson, Hastings, Minn.

[73] Assignee: Minnesota Mining and Manufacturing Company, St. Paul, Minn.

[21] Appl. No.: 76,297

[22] Filed: Sep. 17, 1979

[51] Int. Cl.³ ............................................. G03B 27/54
[52] U.S. Cl. ........................................ 355/67; 355/8; 355/51
[58] Field of Search ................ 362/16, 17; 355/8, 67, 355/51

[56] References Cited

U.S. PATENT DOCUMENTS

| | | | |
|---|---|---|---|
| 3,302,519 | 2/1967 | Young | 355/67 X |
| 3,532,424 | 10/1970 | Miles | 355/51 X |
| 3,947,115 | 3/1976 | Hamaguchi | 355/67 X |
| 3,977,784 | 8/1976 | Hara | 355/67 |
| 3,982,116 | 9/1976 | Sakuma | 355/67 X |
| 4,092,066 | 5/1978 | Kawai | 355/67 |

OTHER PUBLICATIONS

IBM Technical Disclosure Bulletin, "Illumination To Eliminate Shadows", Bersot, et al., vol. 15, No. 2, Jul. 1972, p. 521.

Primary Examiner—Richard A. Wintercorn
Attorney, Agent, or Firm—Cruzan Alexander; Donald M. Sell; William L. Huebsch

[57] ABSTRACT

An illumination means for an electrographic reproduction machine in which a single light source is used in combination with a primary and a secondary elliptical reflector to furnish direct and reflected light as a narrow band of illumination and in which a third flat reflector is used to reflect a portion of the light from the light source which would not otherwise be directed in such a narrow band back into the primary and secondary reflectors to be reflected into the narrow band and to balance the direct and reflected light.

5 Claims, 2 Drawing Figures

ILLUMINATION MEANS FOR ELECTROGRAPHIC REPRODUCTION

BACKGROUND OF THE INVENTION

This invention relates to an illumination means in which the light is concentrated and directed into a narrow band of illumination and which can be used for a copy machine or other reproduction machine.

In the process of electrographic reproduction it is desirable to have a uniform field of illumination incident from opposing directions upon the area to be illuminated so as to eliminate shadows in the resulting copies. The utilization of multiple light sources will provide this uniformity, however it does so at the expense of increased complexity and increased cost. It is thus desirable to provide a uniform field of illumination utilizing a single light source. This can be partially accomplished by the placement of light reflectors to direct the light emerging from the single light source such that it is simultaneously incident from opposing directions at the area to be illuminated. When the light is reflected by these reflectors however, it suffers transmission losses in the range of 10 to 20%, resulting in a decrease of its energy. Since the reflected light has less energy than the light passing directly from the light source to the area to be illuminated, there is an imbalance in the uniformity in the field of illumination. This imbalance will cause shadows in the resulting copy.

SUMMARY OF THE INVENTION

The illumination means of the present invention utilizes the combination of two reflectors to direct the light emerging from a single light source so as to cause its incidence from opposing directions onto the area to be illuminated, and a third reflector positioned to reflect a portion of the light emerging from the light source which would otherwise be incident outside the area to be illuminated, back towards the first two reflectors in order to augment the reflected light and thus balance the reflected light and the light directly incident from the light source.

The illumination means comprises a single light source, primary and secondary elliptical reflectors, and a generally flat reflector. The primary elliptical reflector is positioned to partially envelop the light source with its opposing first and second sides reflecting a portion of the emerging light from the light source through the opening therebetween and onto a predetermined area. The secondary elliptical reflector is disposed to reflect toward the predetermined area the light emerging from the light source which is directed toward it as well as a portion of the light reflected from the primary reflector which would not otherwise be incident at the predetermined area. The flat reflector is fixed across a portion of the opening of the primary reflector adjacent its first side to reflect a portion of the light emerging from the light source that would not otherwise be incident on the predetermined area, back toward the primary reflector. In this manner, this otherwise unused light can be used to increase the amount of reflected light, compensating for the losses due to transmission, and thus balancing the reflected light and direct light incident on the predetermined area.

DESCRIPTION OF THE ACCOMPANYING DRAWING

The present invention will be further described hereinafter with reference to the accompanying drawing wherein:

FIG. 1 is a top view of the illumination means according to the present invention; and FIG. 2 is a sectional view taken along line 2—2' of FIG. 1.

DETAILED DESCRIPTION OF THE PREFERRED EMBODIMENT

Figure 1:
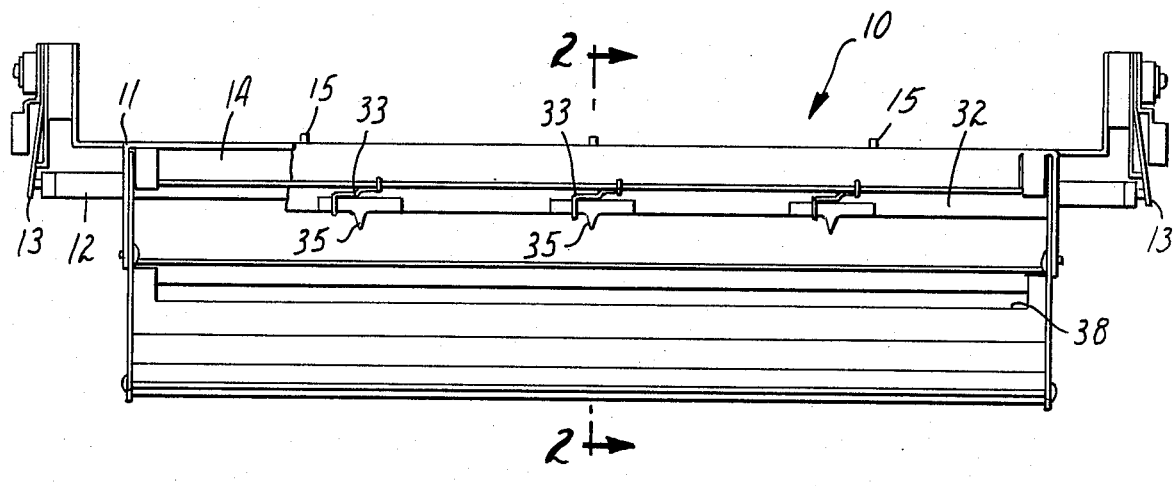
Figure 2:
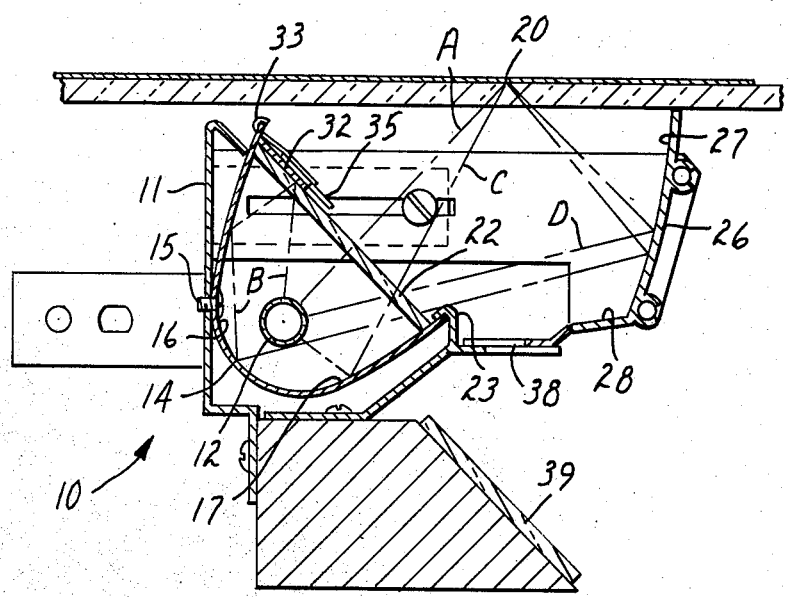

The illumination means 10 of the present invention comprises a frame 11 on which is mounted a light source 12 which is a commercially available haligen exposure lamp obtainable from Toshiba Incorporated and identified by their part number 4404353110. The light source 12 is supported by electrical contacts 13 which are biased against the light source 12 and can be flexed outward during the removal and insertion of the light source 12. A primary elliptical reflector 14 also commercially available from Toshiba and identified by their part number 4404263053 is attached to frame 11 by mounting screws 15. The primary reflector 14 is positioned to envelop the light source 12 with a first side 16 generally above the light source 12 and an opposing second side 17 generally below the light source 12. The opening of the reflector therebetween is generally perpendicular to the elliptical axis of the reflector which runs through the light source 12 and the predetermined area 20 to be illuminated. A heat-absorbing glass 22, commercially available from Toshiba by their part number 4404263070 is positioned across the opening of the primary reflector 14 to prevent the transmission of heat from the light source 12 to the document (not shown) being illuminated. The heat-absorbing glass 22 is held in place by a tab 23 on frame 11.

A secondary elliptical reflector 26 is also attached to frame 11 and positioned adjacent the second side 17 of the primary reflector 14. This secondary reflector 26 is fabricated from aluminum with a highly reflective surface. The secondary reflector 26 has two surfaces, an elliptical reflective surface 27 and an optically black flat surface 28. The elliptical reflective surface 27 conforms to the following coordinates when the X axis is positioned parallel to the flat surface 28.

| Coordinates of Surface | |
|---|---|
| X(mm) | Y(mm) |
| 12.61 | 32.62 |
| 13.91 | 35.54 |
| 15.20 | 32.43 |
| 16.49 | 32.28 |
| 17.77 | 32.11 |
| 19.04 | 31.91 |
| 20.30 | 31.67 |
| 21.55 | 31.41 |
| 22.80 | 31.12 |
| 24.03 | 30.80 |
| 25.25 | 30.46 |
| 26.46 | 30.09 |
| 27.66 | 29.70 |
| 28.85 | 29.28 |
| 30.01 | 28.83 |
| 31.17 | 28.37 |
| 32.31 | 27.88 |
| 33.43 | 27.37 |
| 34.54 | 26.84 |
| 35.64 | 26.30 |
| 36.71 | 25.73 |

-continued

| Coordinates of Surface | |
|---|---|
| X(mm) | Y(mm) |
| 37.77 | 25.14 |
| 38.81 | 24.54 |
| 39.84 | 23.92 |
| 40.84 | 23.29 |
| 41.83 | 22.64 |
| 42.80 | 21.98 |
| 43.75 | 21.30 |
| 44.68 | 20.61 |
| 45.60 | 19.91 |
| 46.05 | 19.56 |

The secondary reflector 26 is positioned so that its reflective surface 27 reflects a portion of the light emerging from the primary reflector 14 and the light source to the predetermined area 20 in an opposing direction to that portion of the light coming from the primary reflector 14 and the light source 12 which is directly incident thereon. The predetermined area 20 is preferably a one-quarter inch by 12 inch area which is to be illuminated.

A generally flat reflector 32 is fixed across a portion (slightly less than ½) of the opening within the primary reflector 14 and upon the heat-absorbing glass 22 so that it is directly adjacent the first side 16 of the primary reflector 14. This flat reflector 32 is constructed of a highly reflective sheet metal such as Alzac ® which is commercially obtainable from Alcoa Alluminum. It is held against the heat-absorbing glass 22 by spring clips 33 which are biased between the flat reflector 32 and the primary reflector 14. A width for the flat reflector 32 of 17.8 mm was chosen by empirical investigation in an effort to balance the reflected light with the directly incident light when using the optical components as chosen and described above. It should be pointed out that the side of the flat reflector 32 facing the area to be illuminated 20 as well as the nonreflecting surfaces within the confines of the primary reflector 14 and the secondary reflector 26 had been painted black to minimize any uncontrolled reflection.

Because of the length of the predetermined area of illumination 22 the chosen light source 12 utilizes a segmented filament. It is inherent in such a segmented filament to have hot spots or spots of uneven illumination at the juncture between the filament segments. To even out these hot spots and further balance the emerging light a plurality of opaque tabs 35 have been placed at selected positions along the length of the light source 12 where these junctions or hot spots occur. These tabs are held in place between the flat reflector 32 and the spring clips 33 to project over the flat reflector toward the second side of the primary elliptical reflector and are movable to adjust for differences found within the manufacturing lot of components. The tabs 35 are stamped from 24 gauge cold-rolled steel which has been painted black and are basically triangular shaped with elongated base portions which can be slid under the spring clips 33.

In operation there are four basic paths in which the light from the light source 12 can reach the predetermined area 20. These are indicated by the letters A, B, C, and D, wherein "A" refers to the direct light from the light source 12 to the predetermined area 20; "B" is the light emerging from the light source 12 toward the flat reflecting surface 32, and then being reflected twice by the primary elliptical reflector 14 and a third time by the secondary reflector 26; "C" is the light emerging from the light source 12 directed toward the primary reflector 14 and reflected to the predetermined area 20; and "D" is the light emerging from the light source 12 toward the secondary reflector 26 and reflected to the predetermined area 20. If the flat reflector 32 is removed the direct light following path A would not be of uniform intensity with the reflected light contributed by paths C and D. This is again due to the inherent losses present during the reflection process. To compensate for these losses the presence of flat reflector 32 causes a portion of the light which would otherwise continue to an area external to the predetermined area 20 of illumination to follow path B and be reflected back into the primary reflector 14 and thus contribute to the light being reflected light by the secondary reflector 26. The amount of the light thus salvaged and contributing to the balancing effect is related to the positioning and the width of the flat reflector 32. If the positioning is kept constant the width of the flat reflector 32 can be experimentally varied to balance the light incident onto the predetermined area with the particular types of components chosen for the other optical elements. It is through this method that the value of 17.8 mm was chosen for the preferred embodiment.

Once the predetermined area is illuminated the light can be reflected off the object (not shown) being illuminated through slot 38 and onto mirror 39 for further processing by the electrographic reproduction machine. If the object being illuminated is a document, the invention is suited to be mounted on a movable carriage so that all the elements thus described move transversely so as to scan the document in a conventional manner.

Having thus described the preferred embodiment of the present invention it will be understood that changes may be made in size, shape, or configuration of some of the parts without departing from the present invention as described in the appended claims.

What is claimed:

1. An illumination means for concentrating and directing light within an electrographic reproduction machine comprising
  a frame;
  a light source mounted to said frame;
  a primary elliptical reflector attached to said frame and positioned to partially envelop said light source, said primary reflector having opposing first and second sides with an opening therebetween such that said opening is generally perpendicular to the elliptical axis of said primary reflector, and being disposed to reflect a portion of the light emerging from said light source through said opening and onto a predetermined area;
  a secondary elliptical reflector attached on said frame adjacent the second side of said primary reflector disposed to reflect toward the predetermined area the light emerging from said light source toward said secondary reflector and a portion of the light reflected from said primary which would not otherwise be incident at said predetermined area from said primary reflector;
  a generally flat reflector fixed across a portion of the opening of said primary reflector adjacent its first side to reflect a portion of the light emerging from said light source that would not otherwise be incident on said predtermined area, back toward said primary reflector so as to be reflected toward said secondary reflector.

2. An illumination means as claimed in claim 1 which includes heat-reflecting means mounted between said first side and said second side of said primary reflector for affording the minimization of the heat transfer from the light source toward said predetermined area.

3. An illumination means as claimed in claim 1 which includes a plurality of opaque tabs slidably positioned along said generally flat reflector and disposed so as to project over said flat reflector toward said second side of said primary elliptical reflector.

4. An illumination means as claimed in claim 3 wherein said tabs are spring-biased against said flat reflector.

5. An illumination means as claimed in claim 1 wherein said flat reflector covers slightly less than half of the opening between the first and second sides of said primary reflector.

* * * * *

UNITED STATES PATENT AND TRADEMARK OFFICE
CERTIFICATE OF CORRECTION

PATENT NO. : 4,239,383
DATED : December 16, 1980
INVENTOR(S) : JOHN A. PETERSON

It is certified that error appears in the above—identified patent and that said Letters Patent is hereby corrected as shown below:

Column 3, line 43, change "22" to -- 20 --.

Claim 1, line 59, after "primary" insert -- reflector --.

Claim 1, line 66, change "predtermined" to -- predetermined --.

Claim 2, line 2, change "reflecting" to -- absorbing --.

Signed and Sealed this

Twelfth Day of April 1983

[SEAL]

Attest:

GERALD J. MOSSINGHOFF

Attesting Officer     Commissioner of Patents and Trademarks